United States Patent
Pitwon et al.

(10) Patent No.: US 9,711,930 B2
(45) Date of Patent: Jul. 18, 2017

(54) OPTICAL SIGNAL WAVEGUIDE DISPERSION FILTER

(71) Applicant: Seagate Technology LLC, Cupertino, CA (US)

(72) Inventors: Richard C. A. Pitwon, Fareham (GB); Alexander C. Worrall, Waterlooville (GB)

(73) Assignee: Seagate Technology LLC, Cupertino, CA (US)

(*) Notice: Subject to any disclaimer, the term of this patent is extended or adjusted under 35 U.S.C. 154(b) by 0 days.

(21) Appl. No.: 14/955,226

(22) Filed: Dec. 1, 2015

(65) Prior Publication Data
US 2017/0155224 A1    Jun. 1, 2017

(51) Int. Cl.
| H01S 3/067 | (2006.01) |
| H01S 3/09  | (2006.01) |
| H01S 3/16  | (2006.01) |
| H01S 3/091 | (2006.01) |

(52) U.S. Cl.
CPC .......... *H01S 3/06708* (2013.01); *H01S 3/091* (2013.01); *H01S 3/0906* (2013.01); *H01S 3/1691* (2013.01)

(58) Field of Classification Search
CPC .... H01S 3/063; H01S 3/0632; H01S 3/06708; G02B 6/02033; G02B 6/102; G02B 6/107; G02B 6/12; G02B 6/122; G02B 6/1223; G02B 6/125; G02B 6/12119; G02B 2006/12119
See application file for complete search history.

(56) References Cited

U.S. PATENT DOCUMENTS

| 4,053,205 | A  |   | 10/1977 | Miller |  |
|-----------|----|---|---------|--------|--|
| 6,157,757 | A  |   | 12/2000 | Giaretta et al. |  |
| 6,665,479 | B2 | * | 12/2003 | Gharavi | G02F 1/065 385/10 |
| 7,031,584 | B2 |   | 4/2006  | Lee et al. |  |
| 7,333,691 | B1 | * | 2/2008  | Gill | B82Y 20/00 359/344 |
| 8,488,920 | B2 |   | 7/2013  | Pitwon |  |
| 8,731,343 | B2 |   | 5/2014  | Pitwon |  |
| 8,891,932 | B2 |   | 11/2014 | Pitwon |  |
| 9,044,907 | B2 |   | 6/2015  | Pitwon |  |
| 2003/0031407 | A1 | * | 2/2003 | Weisberg | G02B 6/023 385/28 |
| 2004/0091230 | A1 | * | 5/2004 | Chen | G02B 6/138 385/142 |

(Continued)

OTHER PUBLICATIONS

Ono et al. "Fabrication of Ultra-compact Er-doped waveguide amplifier based on bismuthate glass", Journal of the Ceramic Society of Japan vol. 116 [10], pp. 1134-1138 (Sep. 11, 2008).*

(Continued)

*Primary Examiner* — Eric Bolda
(74) *Attorney, Agent, or Firm* — Mueting, Raasch & Gebhardt, P.A.

(57) ABSTRACT

An apparatus includes a curved multimode polymer waveguide having at least one inflection point and a doped region being doped with an amplifying dopant. An optical pump source or electrical pump source is configured to excite the doped region and amplify the optical signal transmitting along the curved multimode polymer waveguide.

20 Claims, 3 Drawing Sheets

(56) References Cited

U.S. PATENT DOCUMENTS

| | | | |
|---|---|---|---|
| 2005/0185879 A1* | 8/2005 | Dawes | G01C 19/721 385/14 |
| 2008/0044130 A1 | 2/2008 | Pitwon | |
| 2009/0110355 A1* | 4/2009 | DeMeritt | G02B 6/02009 385/123 |
| 2009/0285542 A1* | 11/2009 | Martin Armani | B82Y 20/00 385/146 |
| 2012/0250705 A1* | 10/2012 | Tong | H01S 3/06704 372/6 |
| 2013/0235450 A1 | 9/2013 | Pitwon | |
| 2014/0325827 A1* | 11/2014 | Lipson | G02B 6/125 29/592 |
| 2014/0376083 A1* | 12/2014 | Onaka | G02B 6/12004 359/334 |
| 2015/0229400 A1* | 8/2015 | Oguma | G02B 6/12011 398/79 |
| 2015/0260916 A1* | 9/2015 | Cherchi | G02B 6/125 385/32 |
| 2015/0300943 A1* | 10/2015 | Jardinier | B01L 3/502715 356/440 |

OTHER PUBLICATIONS

Fujimoto, et al., "Near Infrared Light Amplification in Dye-Doped Polymer Waveguide", 2006, *Japanese Journal of Applied Physics*; 45(12):L355-L357.

Moynihan, et al., "Optical properties of planar polymer waveguides doped with organo-lanthanide complexes", 2007, *Science Direct Optical Materials*; 29(12):1821-1830.

U.S. Appl. No. 14/700, 179, filed Apr. 30, 2015, Worrall et al.

* cited by examiner

OPTICAL SIGNAL WAVEGUIDE DISPERSION FILTER

The disclosure herein relates to an optical signal waveguide dispersion filter to provide lossless mode stripping of optical signals on an optical printed circuit board.

SUMMARY

The present disclosure relates to a polymer waveguide that defines optical mode stripping geometry with an optical amplification node. In particular the disclosure relates to an apparatus, system and method for stripping out higher order optical modes while using optical amplification to amplify the reduced modal dispersion lower order modes that remain in the waveguide.

In at least one embodiment, an apparatus includes a multimode polymer waveguide being curved and having at least one inflection point and a doped region being doped with an amplifying dopant. A pump source is configured to excite the doped region.

In another embodiment, a system includes a multimode polymer waveguide having a curved mode stripping path and a doped region being doped with an amplifying dopant. The curved mode stripping path removes one or more higher order optical modes. An optical or electrical pump source is configured to excite the doped region and amplify an optical signal transmitting through the multimode polymer waveguide.

In a further embodiment, a method includes transmitting a multimode optical signal into a multimode polymer waveguide. The multimode polymer waveguide includes a doped region doped with an amplifying dopant. Then the method includes stripping higher order optical modes from the multimode optical signal by transmitting the multimode optical signal through a curved mode stripping path to form a lesser mode optical signal. The method includes amplifying the multimode optical signal or the lesser mode optical signal by pumping or exciting the doped region with an optical pump source or an electrical pump source.

The above summary is not intended to describe each embodiment or every implementation of the present disclosure. A more complete understanding will become apparent and appreciated by referring to the following detailed description and claims taken in conjunction with the accompanying drawings. In other words, these and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings.

DETAILED DESCRIPTION

Figure 1:
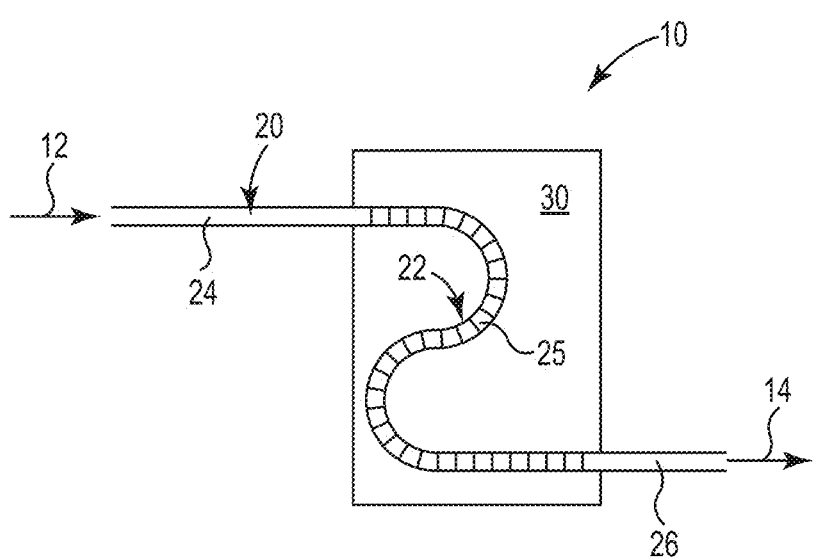
FIG. 1 is a schematic diagram of an exemplary waveguide mode conversion apparatus with a single inflection point.

Polymer based optical waveguides provide numerous desirable properties for use in a multitude of electronic devices, including in some embodiments, data storage devices, network components, network appliances, routers, hubs and other similar devices. These waveguides can be formed on printed circuit boards (PCB) which in turn would be referred to as optical PCBs. These waveguides and optical PCBs can function as a component or building block of a larger structure or apparatus. Alternatively the waveguides and optical PCBs can function on their own without any other related devices or structures. The waveguides and optical PCBs can be integrated and connected to other structures and different components in order to provide an assembly.

The present disclosure relates to a waveguide dispersion filter to provide lossless mode stripping of optical signals on an optical printed circuit board. The polymer waveguide defines mode stripping geometry with an optical amplification node. In particular the disclosure relates to an apparatus, system and method for stripping out higher order modes while using optical amplification to amplify the low dispersion lower order modes that remain in the waveguide. The waveguide amplification node includes an "active" or "doped" waveguide segment or region which upon exposure to pump radiation or electrical energy, excites the amplifying dopant and amplifies signals propagating along the waveguide segment. The curved mode stripping geometry reduces the number of propagating modes in the waveguide, converting it from multi-mode to a lesser mode (such as single mode, for example) with reduced or no modal dispersion. Without amplification, this curved mode stripping geometry results in large optical losses. Waveguide amplification nodes described herein enables the curved polymer waveguides to operate as "lossless" mode strippers by passing the light signals through mode stripping geometry while using optical amplification to amplify the low dispersion, lower order modal confined optical signal. These low dispersion, lower order modal confined optical signals can enable higher data rates (for example, over 20 Gb/sec) be conveyed over longer distances and may support longer telecom wavelengths such as O, C and L band wavelengths. It is to be understood that the waveguide configurations described herein are merely exemplary, and other waveguide configurations having additional or fewer waveguides in any similar (e.g., equivalent) arrangement are considered by the present disclosure. While the present disclosure is not so limited, an appreciation of various aspects of the disclosure will be gained through a discussion provided below.

Exemplary apparatus and systems are be described with reference to FIGS. 1-4. It will be apparent to one skilled in the art that elements from one embodiment may be used in combination with elements of the other embodiments, and that the possible embodiments of such apparatus or and device using combinations of features set forth herein is not limited to the specific embodiments shown in the figures and/or described herein. Further, it will be recognized that the size and shape of various elements herein may be modified but still fall within the scope of the present disclosure, although one or more shapes and/or sizes, or types of elements, may be advantageous over others.

Optical fiber amplifiers have been used with silica fibers to allow long distance transmission of optical signals without intermediary opto-electronic and electro-optic conversion. This is achieved by doping the fibers with lanthanides, such as neodymium and praseodymium, which have emission bands around 1300 nm and erbium which has an emission band around 1550 nm, in certain segments of the fiber known as active regions. The presence of lanthanides allows the active region to be optically excited or "pumped"

to generate a population inversion in its electron states i.e. a higher proportion of dopant atoms or molecules are in an excited state than in their normal lower energy state, which satisfies the condition for stimulated emission whereby an incoming signal photon interacts with the excited atom and the latter's excited electron falls to a lower energy state while emitting a photon with the same energy (wavelength) and phase and in the same direction as the original photon. This gives rise to an amplification of incoming optical signals through the active region and is the dominant mechanism on which laser operation is based, except that lasers have optical resonating cavities where light is contained within the active region typically by mirrors, one of which is only partially reflecting, thus enabling the light intensity to build up to a steady state within the cavity, a small proportion of which (the laser beam) will escape through the partially reflecting mirror along a controlled trajectory.

A disadvantage of silica is that the achievable concentration of dopants in the silica matrix is low (0.1 mol %). Higher doping concentrations give rise to what is known as rare earth ion clustering, which has a detrimental effect on the photoluminescence (ability of substance to absorb and subsequently reemit a photon). Therefore active regions in silica fibers are very long in order to provide effective amplification.

Polymer on the other hand, lends itself to much higher doping concentrations and therefore the active regions can be significantly shorter to enable practical deployment on an optical PCB. Any useful polymeric material can be utilized to form the polymeric waveguide. In many embodiments the polymer waveguide is formed of a polyacrylate, polynorbornene or polysiloxane material. In some embodiments an electroluminescent polymer, such as an electroluminescent conductive polymer that emits light when connected to a power source such as an external voltage, is utilized. Useful electroluminescent or conductive polymers include polyacetylenes, polypyrroles, polyanilines, poly(fluorene)s, polyphenylenes, polypyrenes, polyazulenes or polynaphthalenes.

Some polymer doping schemes that enable optical amplification by polymer waveguides include utilizing organo-lanthanide complexes and dyes. The lanthanide ions $Tb^{3+}$ (Terbium, pump wavelength 368 nm to emit 545 nm), $Dy^{3+}$ (Dysprosium, pump wavelength 365 nm to emit 573 nm), $Eu^{3+}$ (Europium, pump wavelength 395 nm to emit 613 nm) and $Sm^{3+}$ (Samarium, pump wavelength 402 nm to emit 643 nm) fluoresce in the wavelength band of 550 nm-650 nm, which is close to a polymer transmission window of 850 nm. Appropriate complexes of these lanthanides can be devised which push the fluorescence band into the polymer transmission window. In some embodiments the transmission window includes longer wavelengths (such as 1310 nm or 1550 nm for erbium $Er^{3+}$), in which polymer is more lossy (larger light loss) when not being pumped or excited.

Polymer waveguides doped with organo-lanthanide dopants can demonstrate optical fluorescence in the visible and near-infrared required for amplification. Polymer waveguides can be doped with dyes which exhibit amplified spontaneous emission between 825 nm and 870 nm which bounds conventional short reach optical data communication wavelength of 850 nm.

Waveguide amplification nodes enable on-board amplification of optical signals propagating along polymer waveguides. Waveguide amplification nodes include an active waveguide segment that is electrically or optically coupled to a pump. The active waveguide segment may be doped with an amplifying dopant. A "pump" refers to a device or method of exciting electrons in atoms or molecules from a stable ground state to an excited state from which they can either decay spontaneously, emitting a photon (as part of spontaneous emission) or be triggered to decay by an incoming photon of appropriate energy (stimulated emission). The pump may include optical or electronic energy transfer mechanisms, but could also include other forms of energy transfer stimuli such as mechanical, acoustic, magnetic, thermal etc. The active waveguide segment amplifies the optical signal passing through the active waveguide when pumped appropriately. These amplification nodes can be utilized on a passive optical printed circuit board such as a backplane or midplane of a data storage system.

Any light source emitting pump wavelength light, with sufficient optical power and intensity, can be an optical pump. In many embodiments the light pump is a solid state light source such as one or more light emitting diodes, or laser diodes. In many embodiments, the optical pump directs light orthogonally to the plane of the waveguide amplification node. In many embodiments, light emitting diodes are used as optical pumps and can emit pump light from 350 to 410 nm.

An electrical pump can be any electrical source or electrical contacts that provide a voltage to electroluminescent polymer material (forming the waveguide) that is doped with the amplifying dopants described above. For example, electrical contacts can be in direct electrical connection with the electroluminescent polymer material (forming the waveguide). It is known that polymer light-emitting diodes (PLED), and more generally, light-emitting polymers (LEP), include an electroluminescent conductive polymer, that emits light when connected to a power source such as an external voltage. They are conventionally used in the form of thin films for full-spectrum color displays. Polymer organic light emitting diodes (OLEDs) are efficient and require a relatively small amount of power for the amount of light produced.

Figure 2:
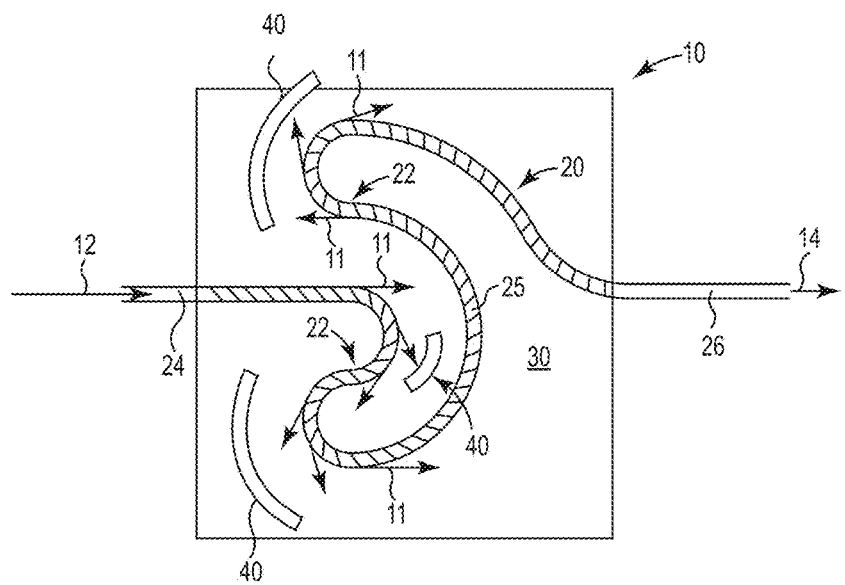
FIG. 2 is a schematic diagram of an exemplary waveguide mode conversion apparatus with two inflection points.
Figure 3:
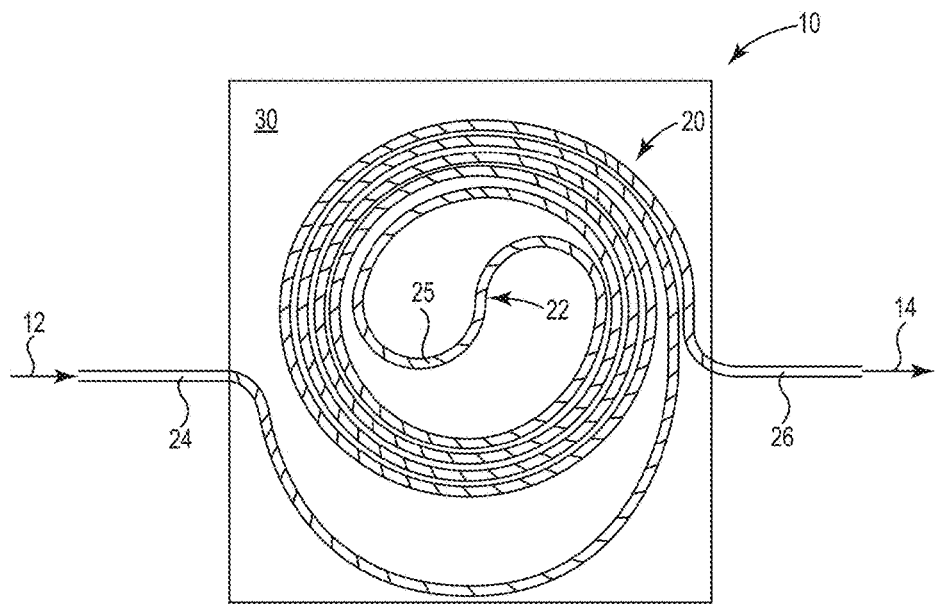
FIG. 3 is a schematic diagram of an exemplary waveguide mode conversion apparatus defining a parabolic spiral.

FIG. 1 is a schematic diagram of an exemplary waveguide mode conversion apparatus 10 with a single inflection point 22. FIG. 2 is a schematic diagram of an exemplary waveguide mode conversion apparatus 10 with two inflection points 22. FIG. 2 illustrates the lost light 11, it is understood that FIG. 1 and FIG. 3 also includes this lost light 11 but is not shown. FIG. 3 is a schematic diagram of an exemplary waveguide mode conversion apparatus 10 defining a parabolic spiral (or Fermat's spiral). The term "inflection point" refers to a point on a curve at which the curve changes from being concave to convex or convex to concave, or a point on the curve at which the radius of curvature changes sign.

The figures illustrate a top view of single waveguide apparatus and system. It is to be understood that the waveguide configurations described herein are merely exemplary, and other waveguide configurations having additional waveguides in any similar (e.g., equivalent) arrangement are considered by the present disclosure. In many embodiments optical printed circuit boards have a plurality of parallel and coextending waveguides.

The apparatus or system 10 includes a curved multimode polymer waveguide 20 and having at least one inflection point 22. The multimode polymer waveguide 20 includes a doped region 25 being doped with an amplifying dopant a pump source 30 configured to excite the doped region 25, as described above. The doped region can also be referred to as an "active" region or waveguide segment. The multimode polymer waveguide 20 defines a curved mode stripping path.

The phrase "curved mode stripping path" refers to waveguide geometry that removed one or more higher order optical modes in an optical signal. The curved mode stripping path has a radius of curvature that does not allow the one or more higher order optical modes in an optical signal to remain confined within the waveguide by total internal reflection, for example. The resulting optical signal is a low, zero loss and amplified (via the amplification node), dispersion-reduced or cleaned version of the input signal at the output of the curved mode stripping path.

The curved mode stripping path removes one or more higher order optical modes (that may contribute to modal dispersion). However, the curved mode stripping path also results in a significant loss of light. Utilizing a light amplifying node, where a portion of the multimode polymer waveguide 20 includes a doped region 25 being doped with an amplifying dopant and exciting the amplifying dopant with an optical or electrical pump source 30, amplifies the lower mode light signal and compensates for the light losses created by the curved mode stripping path. Thus the mode stripping geometry coupled with the amplifying node provides a "lossless" mode stripper that may amplify the cleaned optical signal.

The doped region 25 is illustrated as being coextensive with the curved mode stripping path and waveguide path inflection point 22. In some embodiments, the doped region 25 may be only upstream of the waveguide path inflection point 22, or only downstream of the waveguide path inflection point 22. In some embodiments, the doped region 25 may be only upstream of the curved mode stripping path, or only downstream of the curved mode stripping path. In many embodiments, the doped region 25 is coextensive with the entire curved portion of the multimode polymer waveguide 20 or is coextensive with the entire curved mode stripping path of the multimode polymer waveguide 20.

The multimode polymer waveguide 20 of the apparatus or system 10 has a light input region 24 and a light output region 26. At least one waveguide path inflection point 22 (in at least one plane) is in optical communication between the light input region 24 and a light output region 26. A multimode optical signal 12 is transmitted into the light input region 24 and a reduced modal dispersion optical signal is transmitted through the light output region 26. In many embodiments a multimode optical signal 12 is transmitted into the light input region 24 and a reduced modal dispersion lesser mode or single mode optical signal is transmitted through the light output region 26. For example, the multimode polymer waveguide 20 transmits a multimode optical signal 12 upstream of the at least one inflection point 22 and transmits a signal mode optical signal 14 downstream of the at least one inflection point 22.

The multimode polymer waveguide 20 may have a substantially constant cross-sectional area along the length of the multimode polymer waveguide 20. For example, the light input region 24, the curved mode stripping path and a light output region 26 may all have substantially the same (within at least 10%) cross-sectional surface area and shape. In many embodiments the multimode polymer waveguide 20 has a substantially constant (within at least 10% or within at least 5%) refractive index (step-index waveguide). One exemplary multimode polymer waveguide 20 has a generally square, rectangular or trapezoidal cross-sectional area having side lengths in a range from 20 to 100 micrometers or from 35 to 75 micrometers.

Cross-talk suppression elements 40 can be positioned adjacent to the curved mode stripping path or the inflection point 22. The cross-talk suppression elements 40 may absorb or block lost light 11 occurring along the mode stripping path or the inflection point 22. The lost light 11 may be ejected from the polymer waveguide due to exceeding TIR, or modal expulsion caused by light moving through a waveguide with a change in effective refractive index profile, for example, when the waveguide changes direction (transition bend loss) or light scattering at the side walls. In addition, the amplification node may give rise to some optical loss, for instance, amplification of light in higher order modes would consequently cause an increase in scattered light through the side walls. Thus, optical cross-talk between waveguide segments can be expected.

In order to eliminate or reduce optical crosstalk, cross-talk suppression features or elements are deployed between waveguide segments and can be positioned adjacent to the curved mode stripping path or the inflection point 22, and within the amplification node.

Any suitable means for suppressing crosstalk may be provided. In one example, air-trenches are etched or patterned in the cladding between waveguides or waveguide segments. In another example, optical blocking material is deposited in trenches between the waveguide segments. In many embodiments, a crosstalk suppression element is provided which is made up of a trench containing a transparent matrix having suspended therein an optically absorbent material. The transparent matrix is the same material as used for the cladding of the waveguides. This has the effect that optical signal light passing through the waveguides "sees" no boundary between the cladding and the optical crosstalk suppression region and accordingly there is no reflection of stray signal light back into the waveguide core at the cladding/trench boundary. The light is then absorbed by the suspended optical absorbent material within the trench.

A method includes transmitting a multimode optical signal 12 into a multimode polymer waveguide 20. The multimode polymer waveguide 20 includes a doped region 25 being doped with an amplifying dopant. Then the method includes stripping higher order optical modes 11 from the multimode optical signal 12 by transmitting the multimode optical signal 12 through a curved mode stripping path to form a lesser mode optical signal 14. The method includes amplifying the multimode optical signal 12 or the lesser mode optical signal 14 by pumping or exciting a doped region 25 with an optical pump or an electrical pump source 30. In many embodiments, the stripping step and the amplifying step occur simultaneously within the curved mode stripping path having at least one inflection points 22. In many embodiments, the doped region 25 is coextensive with the entire length of the curved mode stripping path.

The combination of the mode stripping geometry and the amplification node within a polymer waveguide enables a significant reduction in signal modal dispersion allowing for a low cost, high data rate to be conveyed across longer distances. Thus, longer telecommunication wavelengths such as O, C and L band wavelengths (not typically supported by polymeric waveguides) can be supported by polymeric waveguides described herein.

Figure 4:
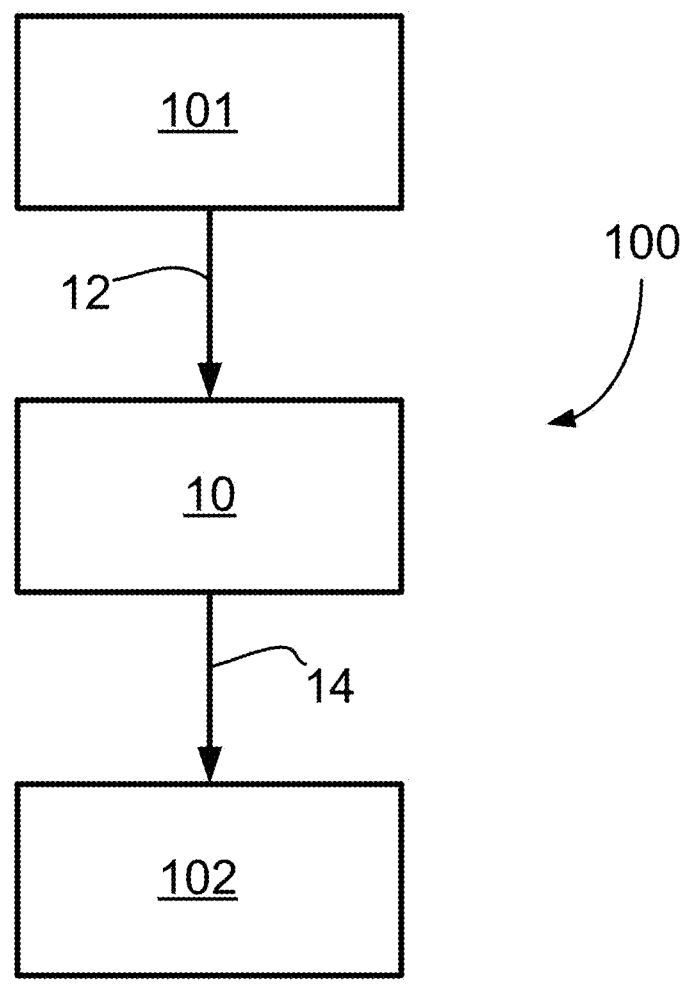
FIG. 4 is a schematic diagram of an exemplary system including the waveguide mode conversion apparatus.

FIG. 4 is a schematic diagram of an exemplary system 100 including the waveguide mode conversion apparatus 10. The system 100 may include the waveguide mode conversion apparatus 10 optically coupled between a first optical component 101 and a second optical component 102. The first optical component 101 may provide a multimode optical signal 12 to the waveguide mode conversion apparatus 10. The waveguide mode conversion apparatus 10 removes or strips one or more higher order optical modes from the optical signal and amplifies the lesser mode optical signal to transmit a lesser mode optical signal 14 that may be amplified, as compared to the multimode optical signal 12.

The first optical component 101 and a second optical component 102 can be any useful component. For example, the first optical component 101 and a second optical component 102 can be a storage device (or data storage device) and a electro-optical circuit board, or a computing device (such as a, processor, network, etc.). The first optical component 101 and a second optical component 102 can be modular components of an optical backplane, midplace or frontplane for a data storage device or other computing or communication element.

In the preceding description, reference is made to the accompanying set of drawings that form a part hereof and in which are shown by way of illustration several specific embodiments. It is to be understood that other embodiments are contemplated and may be made without departing from (e.g., still falling within) the scope or spirit of the present disclosure. The preceding detailed description, therefore, is not to be taken in a limiting sense. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

It is noted that terms such as "top", "bottom", "above", "below", etc. may be used in this disclosure. These terms should not be construed as limiting the position or orientation of a structure, but should be used as providing spatial relationship between the structures.

Embodiments of the apparatus including the curved mode stripping path and waveguide amplification node to reduce optical dispersion in a polymer waveguide on optical printed circuit boards are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation, and the present invention is limited only by the claims that follow.

What is claimed is:

1. An apparatus comprising:
    a curved multimode polymer waveguide having at least two inflection points and a doped region being doped with an amplifying dopant; and
    a pump source configured to excite the doped region.

2. The apparatus of claim 1, wherein the multimode polymer waveguide transmits a multimode optical signal upstream of the at least one inflection point and transmits a lesser mode optical signal downstream of the at least one inflection point.

3. The apparatus of claim 1, wherein the polymer waveguide has a substantially constant cross-sectional area upstream of the at least one inflection point, along the inflection point, and downstream of the inflection point.

4. The apparatus of claim 1, wherein the doped region is co-extensive with the curved multimode polymer waveguide.

5. The apparatus of claim 1, wherein the pump source is an optical pump source.

6. The apparatus of claim 1, wherein the pump source is an electrical pump source and the doped region comprises an electroluminescent polymer.

7. The apparatus of claim 1, wherein the multimode polymer waveguide is curved and has at least one inflection point defining a Fermat's spiral.

8. The apparatus of claim 1, further comprising crosstalk suppression elements adjacent to the at least one inflection point.

9. A system comprising:
    a multimode polymer waveguide having a curved mode stripping path and a doped region being doped with an amplifying dopant, the curved mode stripping path removes one or more higher order optical modes, the multimode polymer waveguide defining a parabolic spiral or a Fermat's spiral that includes the curved mode stripping path; and
    an optical or electrical pump source configured to excite the doped region and amplify an optical signal transmitting through the multimode polymer waveguide.

10. The system of claim 9, wherein the multimode polymer waveguide transmits a multimode optical signal upstream of curved mode stripping path and transmits a lesser mode optical signal downstream of the curved mode stripping path.

11. The system of claim 9, wherein the polymer waveguide has a substantially constant cross-sectional area along the curved mode stripping path.

12. The system of claim 9, wherein the doped region is co-extensive with the curved mode stripping path.

13. The system of claim 9, wherein the pump source is an optical pump source.

14. The system of claim 9, wherein the pump source is an electrical pump source and the doped region comprises an electroluminescent polymer.

15. The system of claim 9, wherein the curved mode stripping path comprises at least two inflection points.

16. The system of claim 9, further comprising crosstalk suppression elements adjacent to the curved mode stripping path.

17. An apparatus comprising:
    a curved multimode polymer waveguide having at least one inflection point and a doped region being doped with an amplifying dopant;
    a pump source configured to excite the doped region; and
    a crosstalk suppression element adjacent to the at least one inflection point.

18. The apparatus of claim 17, wherein the multimode polymer waveguide has a curved mode stripping path and a crosstalk suppression element adjacent to the curved mode stripping path.

19. The apparatus of claim 17, wherein the multimode polymer waveguide comprises at least two inflection points.

20. The apparatus of claim 17, wherein the multimode polymer waveguide defines a parabolic spiral or a Fermat's spiral.

* * * * *